(12) United States Patent
Serrurier et al.

(10) Patent No.: US 10,544,568 B2
(45) Date of Patent: Jan. 28, 2020

(54) RETAINER SLEEVE FOR GROUND ENGAGING TOOLS

(71) Applicant: Caterpillar Inc., Peoria, IL (US)

(72) Inventors: Doug Serrurier, Peoria, IL (US); Mihai Mircea Balan, Dunlap, IL (US); Scott Anthony Schick, Morton, IL (US); Eric Thomas Sinn, East Peoria, IL (US); Jason Grant Jura, Peoria, IL (US); Arun Venugopal, Chennai (IN); Kadirvel Muthusamy, Chennai (IN)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 15/479,320

(22) Filed: Apr. 5, 2017

(65) Prior Publication Data

US 2017/0328037 A1    Nov. 16, 2017

Related U.S. Application Data

(60) Provisional application No. 62/337,001, filed on May 16, 2016.

(51) Int. Cl.

| | |
|---|---|
| *E02F 9/28* | (2006.01) |
| *B29C 64/393* | (2017.01) |
| *B22F 3/105* | (2006.01) |
| *G05B 19/4099* | (2006.01) |
| *B33Y 50/02* | (2015.01) |

(Continued)

(52) U.S. Cl.
CPC .......... *E02F 9/2833* (2013.01); *B22F 3/1055* (2013.01); *B29C 64/393* (2017.08); *G05B 19/4099* (2013.01); *B22F 2003/1057* (2013.01); *B33Y 50/02* (2014.12); *B33Y 70/00* (2014.12); *B33Y 80/00* (2014.12); *E02F 9/2825* (2013.01);

(Continued)

(58) Field of Classification Search
CPC ..... E02F 9/2833; E02F 9/2841; E02F 9/2858; F16B 21/18
USPC .................................. 411/517, 519
See application file for complete search history.

(56) References Cited

U.S. PATENT DOCUMENTS

| | | | | |
|---|---|---|---|---|
| 3,389,923 | A | * | 6/1968 | Love, Jr. ............... F16L 37/088 285/321 |
| 3,527,120 | A | * | 9/1970 | Duer ........................ F16D 1/08 403/359.5 |

(Continued)

FOREIGN PATENT DOCUMENTS

DE    102008052389    4/2010

*Primary Examiner* — Matthew Troutman
(74) *Attorney, Agent, or Firm* — Finnegan, Henderson, Farabow, Garrett & Dunner, LLP

(57) ABSTRACT

A retainer sleeve configured for use in a retainer system for a ground engaging tool includes a plurality of plate-like sections, each section being flexibly joined with an adjacent section along either a radially inner edge or a portion of a radially outer edge. The radially inner edges of the plurality of sections form part of a segmented inner surface configured for engagement with an outer surface of a locking member of the retainer system. The inner surface extends partially around a central axis of the retainer sleeve to form a substantially C-shaped retainer sleeve having opposite circumferential ends that are spaced from each other. The radially outer edges of the plurality of sections form part of a segmented, frustoconical outer surface configured for engagement in an internal lock cavity of a ground engaging tool tip.

16 Claims, 13 Drawing Sheets

(51) Int. Cl.
 *B33Y 70/00* (2015.01)
 *B33Y 80/00* (2015.01)
(52) U.S. Cl.
 CPC .............. *G05B 2219/35134* (2013.01); *G05B 2219/49007* (2013.01)

(56) References Cited

U.S. PATENT DOCUMENTS

| | | | | |
|---|---|---|---|---|
| 3,624,827 A * | 11/1971 | Liess | ............... | E02F 9/2833 172/713 |
| 3,767,266 A * | 10/1973 | Krekeler | ............... | E21C 35/197 299/107 |
| 3,997,989 A | 12/1976 | Stepe | | |
| 4,006,659 A * | 2/1977 | Wurzel | ............... | F16B 21/18 384/903 |
| 4,327,947 A * | 5/1982 | Bower, Jr. | ............... | E21C 35/197 279/19.7 |
| 4,611,417 A * | 9/1986 | Carlson | ............... | E02F 9/2816 299/108 |
| 4,716,668 A * | 1/1988 | Hahn | ............... | E02F 9/2841 267/182 |
| 4,727,663 A * | 3/1988 | Hahn | ............... | E02F 9/2841 37/458 |
| 4,918,843 A | 4/1990 | Kiesewetter et al. | | |
| 5,009,017 A | 4/1991 | Diekevers et al. | | |
| 5,205,057 A * | 4/1993 | Garman | ............... | E02F 9/2841 37/452 |
| 5,261,650 A * | 11/1993 | Hein | ............... | B60G 15/068 267/153 |
| 6,352,439 B1 * | 3/2002 | Stark | ............... | F16L 37/008 174/655 |
| 8,495,826 B2 | 7/2013 | Itou et al. | | |
| 9,027,268 B2 | 5/2015 | Campomanes et al. | | |
| 9,033,610 B2 | 5/2015 | Lopez Almendros et al. | | |
| 9,074,350 B2 | 7/2015 | LaHood et al. | | |
| 2014/0352180 A1 | 12/2014 | Campomanes | | |

* cited by examiner

RETAINER SLEEVE FOR GROUND ENGAGING TOOLS

TECHNICAL FIELD

The present disclosure relates generally to ground engaging tools and, more particularly, to a retainer sleeve used in an assembly for removably attaching the ground engaging tools to various earth-working machines.

BACKGROUND

Earth-working machines, such as, for example, excavators, wheel loaders, hydraulic mining shovels, cable shovels, bucket wheels, bulldozers, and draglines, are generally used for digging or ripping into the earth or rock and/or moving loosened work material from one place to another at a worksite. These earth-working machines include various earth-working implements, such as a bucket or a blade, for excavating or moving the work material. These implements can be subjected to extreme wear from the abrasion and impacts experienced during the earth-working applications.

To protect these implements against wear, and thereby prolong the useful life of the implements, various ground engaging tools, such as teeth, edge protectors, and other wear members, can be provided to the earth-working implements in the areas where the most damaging abrasions and impacts occur. These ground engaging tools are removably attached to the implements using customized retainer systems, so that worn or damaged ground engaging tools can be readily removed and replaced with new ground engaging tools.

Many retainer systems have been proposed and used for removably attaching various ground engaging tools to earth-working implements. One example of such retainer systems is disclosed in U.S. Pat. No. 7,640,684 to Adamic et al. The disclosed retainer system includes a releasable locking assembly for attaching a wear member to a support structure. The wear member includes at least one pin-retainer-receiving opening in one side. The opening is tapered, being narrower at its outer surface and wider at its inner surface. The support structure includes at least one pin receiving recess which generally aligns with the opening in the wear member when the wear member and the support structure are operatively coupled. A pin retainer that is frustoconically shaped and threaded internally is inserted into the opening in the wear member. The wear member is slidably mounted onto the support structure. The pin that is externally threaded is screwed into the pin retainer by the application of torque force from a standard ratchet tool. The pin extends through the wear member and into the recess in the support structure to lock the wear member to the support structure. The pin may be released using a ratchet tool and removed from the pin retainer. The wear member may then be removed from the support structure.

Another example of a retainer system for removably attaching various ground engaging tools to earth-working implements is disclosed in U.S. Pat. No. 7,762,015 to Smith et al. The retainer system includes a rotating lock having a slot for receiving a post of an adapter mounted to or part of a work tool. When the lock is rotated, the entrance to the slot is blocked and the post cannot slide out of the slot.

Many problems and/or disadvantages still exist with these known retainer systems. Various embodiments of the present disclosure may solve one or more of the problems and/or disadvantages.

SUMMARY

According to one exemplary aspect, the present disclosure is directed to a retainer sleeve configured for use in a retainer system for a ground engaging tool. The retainer sleeve may include a plurality of plate-like sections, each section being flexibly joined with an adjacent section along either a radially inner edge or a portion of a radially outer edge. The radially inner edges of the plurality of sections form part of a segmented inner surface configured for engagement with an outer surface of a locking member of the retainer system. The inner surface may extend partially around a central axis of the retainer sleeve to form a substantially C-shaped retainer sleeve having opposite circumferential ends that are spaced from each other. The radially outer edges of the plurality of sections form part of a segmented, frustoconical outer surface configured for engagement in an internal lock cavity of a ground engaging tool tip.

In another exemplary aspect of the present disclosure, a retainer system for a ground engaging tool may include a lock configured to be rotated about a lock rotation axis, and a metal retainer sleeve. The metal retainer sleeve may include an outer surface configured to mate with a lock cavity of a ground engaging tool tip, and an inner surface extending at least partially around the lock rotation axis and being aligned in a direction substantially parallel to the lock rotation axis. The inner surface may be configured to receive the lock rotatably about the lock rotation axis and in a direction substantially parallel to the lock rotation axis. The metal retainer sleeve may also include a plurality of sections joined together along radially inner edges of adjacent sections or along radially outer edges of adjacent sections in an accordion-like arrangement configured such that the metal retainer sleeve is compressible for insertion into the lock cavity, and expandable when the metal retainer sleeve seats inside the lock cavity.

In still another exemplary aspect of the present disclosure, a metal retainer sleeve configured for use in a retainer system for a ground engaging tool may include an outer surface configured to mate with a lock cavity of a ground engaging tool tip, and an inner surface extending at least partially around a lock rotation axis. The inner surface may be aligned in a direction substantially parallel to the lock rotation axis, and the inner surface may be configured to receive the lock rotatably about the lock rotation axis and in a direction substantially parallel to the lock rotation axis. The metal retainer sleeve may also include a plurality of sections joined together along radially inner edges of adjacent sections or along radially outer edges of adjacent sections in an accordion-like arrangement configured such that the metal retainer sleeve is compressible for insertion into the lock cavity, and expandable when the metal retainer sleeve seats inside the lock cavity.

DETAILED DESCRIPTION

Figure 1:
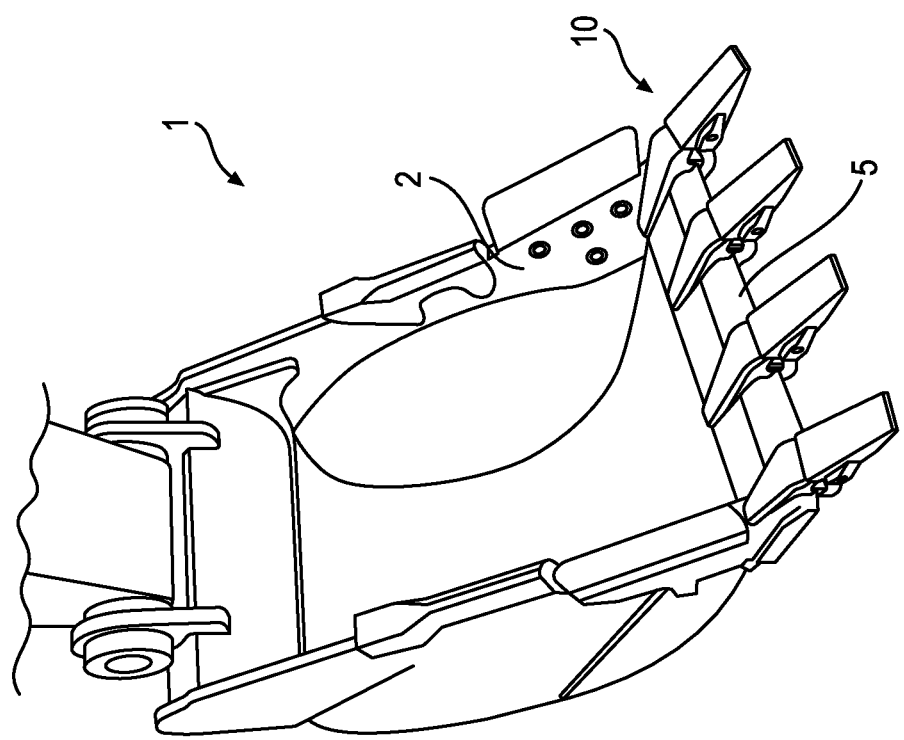
FIG. 1 is a perspective view of a loader bucket having a plurality of ground engaging tools attached thereto according to one exemplary embodiment of the present disclosure.

FIG. 1 illustrates an excavator bucket assembly 1 as an exemplary implement of an earth-working machine. Excavator bucket assembly 1 includes a bucket 2 used for excavating work material in a known manner. Bucket 2 may include a variety of ground engaging tools. For example, bucket 2 may include a plurality of tooth assemblies 10, as ground engaging tools, attached to a base edge 5 of bucket 2. Tooth assemblies 10 may be secured to bucket 2 employing retainer systems according to the present disclosure. While various embodiments of the present disclosure will be described in connection with a particular ground engaging tool (e.g., tooth assembly 10), it should be understood that the present disclosure may be applied to, or used in connection with, any other type of ground engaging tools or components. Further, it should be understood that one or more features described in connection with one embodiment can be implemented in any of the other disclosed embodiments unless otherwise specifically noted.

Figure 2:
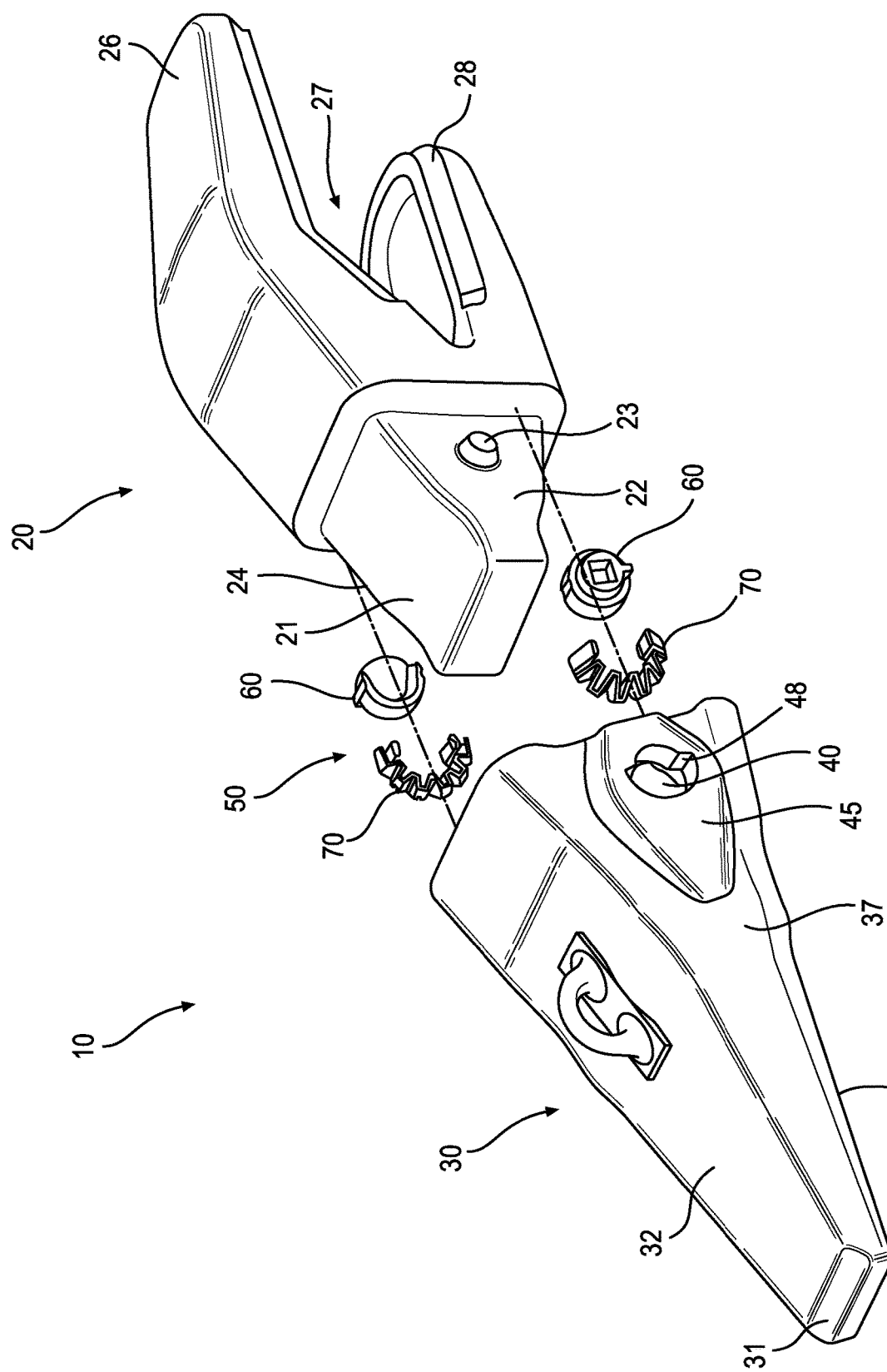
FIG. 2 is a perspective view of a tooth assembly according to one exemplary embodiment of the present disclosure.

Referring to FIG. 2, tooth assembly 10 may include an adapter 20 configured to engage base edge 5 of bucket 2 or other suitable support structure of an implement. Tooth assembly 10 may also include a ground-engaging tool tip 30 configured to be removably attached to adapter 20. Tooth assembly 10 may further include a retainer system 50 configured to secure tip 30 to adapter 20. Tip 30 endures the majority of the impact and abrasion caused by engagement with work material, and wears down more quickly and breaks more frequently than adapter 20. Consequently, multiple tips 30 may be attached to adapter 20, worn down, and replaced before adapter 20 itself needs to be replaced. As will be detailed herein, various exemplary embodiments of retainer system 50, consistent with the present disclosure, may facilitate attachment and detachment of ground engaging tools to and from support structure of an implement, and may provide components that are able to withstand high temperature and other harsh operating conditions.

Adapter 20 may include a pair of first and second mounting legs 26, 28 defining a recess 27 therebetween for receiving base edge 5. Adapter 20 may be secured in place on base edge 5 by attaching first mounting leg 26 and second mounting leg 28 to base edge 5 using any suitable connection method. For example, mounting legs 26 and 28 and base edge 5 may have corresponding apertures (not shown) through which any suitable fasteners such as bolts or rivets may be inserted to hold adapter 20 in place. Alternatively or additionally, mounting legs 26 and 28 may be welded to the corresponding top and bottom surfaces of base edge 5. Any other connection method and/or configuration known in the art may be used alternatively or additionally. For example, in some exemplary embodiments, an adapter may be configured to use any of the retainer systems disclosed herein to secure the adapter to a suitable support structure of an implement.

Figure 3:
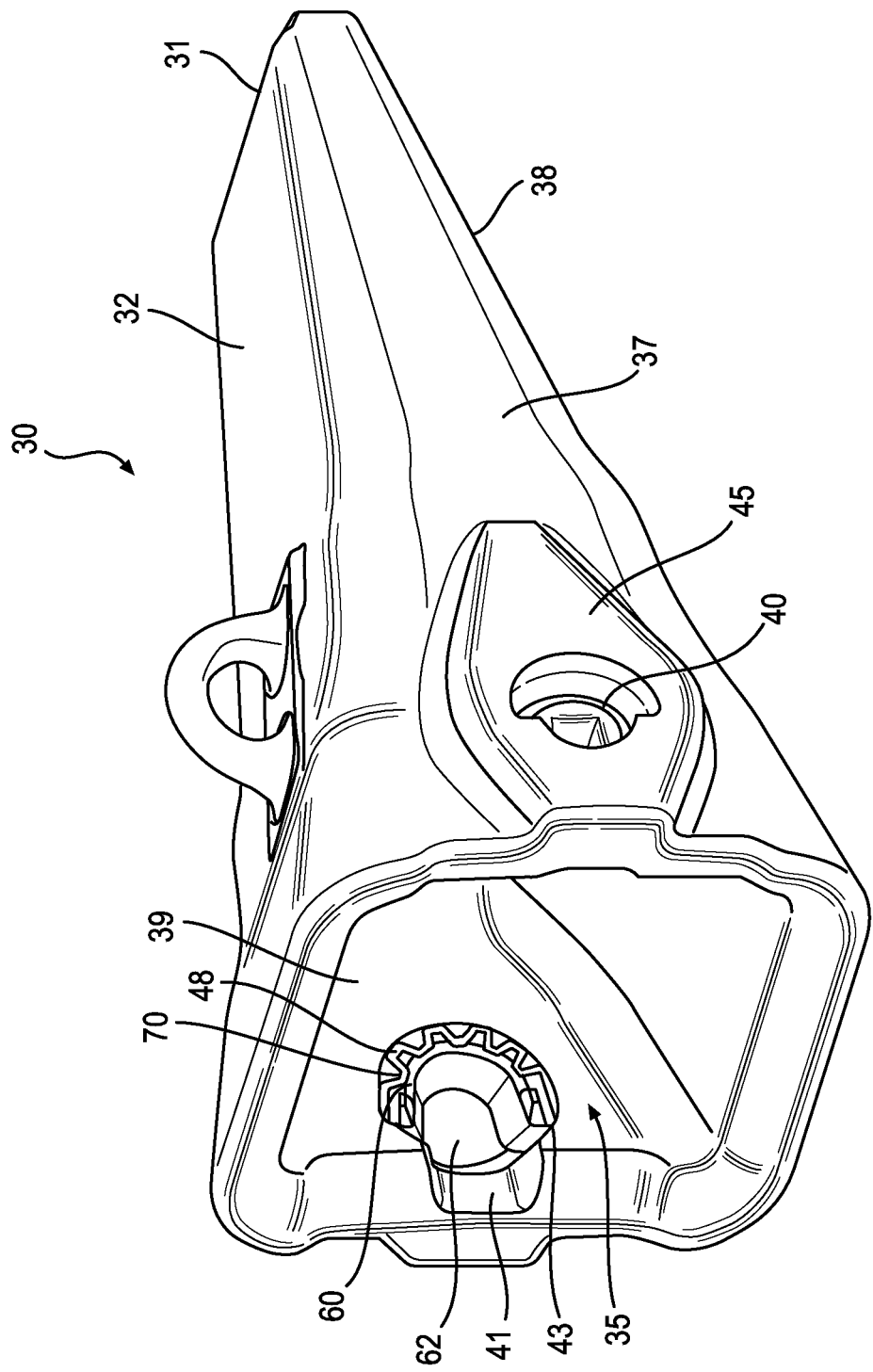
FIG. 3 is a perspective view of a tip of the tooth assembly shown in FIG. 2, with a lock and a retainer sleeve positioned in a lock cavity of the tip.
Figure 4:
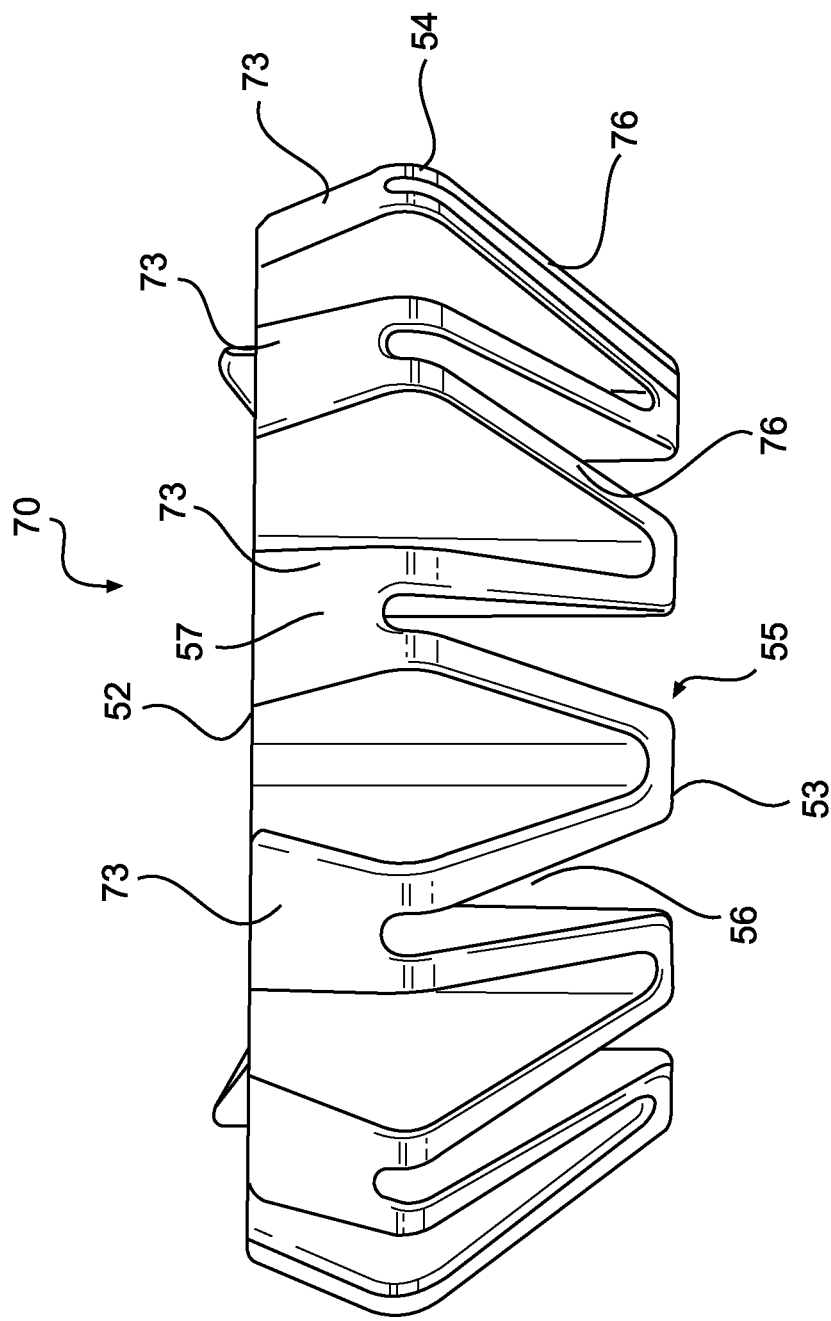
FIG. 4 is a side elevation view from a radially outer side of a retainer sleeve according to one exemplary embodiment of the present disclosure.

Adapter 20 may include a nose 21 extending in a forward direction. As shown in FIG. 3, nose 21 may be configured to be received in a mounting cavity 35 of tip 30. Nose 21 may be configured to support tip 30 during use of bucket 2 and to facilitate retention of tip 30 on nose 21 when bearing the load of the work material. Nose 21 may include an integral post 23 extending from each lateral side 22, 24. Post 23 may have various shapes and sizes. In one exemplary embodiment, as shown in FIG. 2, post 23 may have a frustoconical shape. As will be described in more detail herein, posts 23 may cooperate with retainer system 50 to secure tip 30 to adapter 20.

As shown in the rear view of tip 30 in FIG. 3, tip 30 may define mounting cavity 35 inside tip 30 having a complementary configuration relative to nose 21 of adapter 20. Tip 30 may have various outer shapes. For example, as shown in FIG. 2, tip 30 may generally taper as it extends forward. For example, an upper surface 32 of tip 30 may slope downward as it extends forward, and a lower surface 38 of tip 30 may extend generally upward as it extends forward. Alternatively, lower surface 38 may extend generally straight or downward as it extends forward. At its forward end, tip 30 may have a wedge-shaped edge 31.

As mentioned above, tip 30 may be secured to adapter 20 via retainer system 50. Retainer system 50 may include a lock 60 and a retainer sleeve 70. Tip 30 and/or adapter 20 may have various configurations for accommodating lock 60 and retainer sleeve 70 therein. For example, in the exemplary embodiment shown in FIGS. 2 and 3, tip 30 may include a lock cavity 40 defined in a lock boss 45 protruding from each of its lateral sides 37 for housing lock 60 and retainer sleeve 70. Lock 60 and retainer sleeve 70 may be seated within lock cavity 40 when assembled to tip 30. Tip 30 may also include lock boss 45 extending outwardly of each lock cavity 40. While the exemplary embodiment shown in FIGS. 2 and 3 has lock cavity 40 and lock boss 45 on each lateral side 37 of tip 30, tip 30 may have different numbers and/or arrangements of lock cavities 40 and lock bosses 45.

FIGS. 4-7 illustrate various views of an exemplary metal retainer sleeve 70 in accordance with an implementation of this disclosure. The accordion-like structure of metal retainer sleeve 70 enables metal retainer sleeve 70 to be resiliently compressed for insertion into lock cavity 40 and expanded for seating within lock cavity 40. FIGS. 8-13 are lateral and longitudinal cross-sectional assembly views that illustrate compression of metal retainer sleeve 70 during insertion into lock cavity 40 (FIGS. 8 and 9), expansion of metal retainer sleeve 70 for seating within lock cavity 40 (FIGS. 10 and 11), and insertion of lock 60 into metal retainer sleeve 70 after the metal retainer sleeve is seated within lock cavity 40. In one exemplary embodiment, lock 60 and retainer sleeve 70 may be configured to seat within an inner surface 43 of lock cavity 40 in a manner allowing lock 60 to rotate at least partially around a lock rotation axis 65 (FIG. 17) relative to retainer sleeve 70. As best shown in FIGS. 10-13, retainer sleeve 70 may seat directly against inner surface 43 of lock cavity 40. Lock 60 may seat against a segmented inner surface formed by radially inner edges 74 of retainer sleeve 70. FIG. 3 illustrates a perspective view of a tip of the tooth assembly shown in FIG. 2, with a lock 60 and a retainer sleeve 70 positioned in lock cavity 40 of tip 30. On the rear side of lock cavity 40, lock cavity 40 may open into a side slot 41 that extends rearward from lock cavity 40 along inner surface 39 of lateral side 37. Side slot 41 may have a cross-section configured to allow passage of at least a portion of post 23 of adapter 20 being inserted from the rear end of tip 30.

As best seen in FIGS. 4-7, retainer sleeve 70 may be configured to include a plurality of plate-like sections 55 extending from a bottom edge 53 to a top edge 52 of retainer sleeve 70. Each section 55 may have a substantially equivalent shape, and each section may be flexibly joined by a web section 57 with an adjacent section along either substantially the entire length of a radially inner edge 74 or along a portion of a radially outer edge 73. Radially inner edges 74 of the plurality of sections 55 form part of a segmented inner surface configured for engagement with an outer surface 66 of lock 60. The segmented inner surface of retainer sleeve 70 may extend partially around a central axis 75 of retainer sleeve 70 to form a substantially C-shaped retainer sleeve 70 having opposite circumferential ends that are spaced from each other. Radially outer edges 73 of the plurality of sections may form part of a segmented, frustoconical outer surface configured for engagement in lock cavity 40 of ground engaging tool tip 30.

As best seen in the cross-sectional assembly views of FIGS. 8-11, the plurality of plate-like sections 55 may be flexibly joined together such that the substantially C-shaped retainer sleeve 70 is compressible for insertion into lock cavity 40, and expandable when the substantially C-shaped retainer sleeve 70 seats inside lock cavity 40. As shown in FIGS. 4-7, at least some of the plate-like sections 55 may be substantially trapezoidal or triangular in shape. The radially outer edges 73 forming the segmented frustoconical outer surface may be joined together by web sections 57, which may extend along a portion of each of radially outer edges 73 for less than the full length of each outer edge 73. Sections 55 may also include longer radially outer edges 76 that are angled away from each other and not joined to each other along their lengths, thereby allowing retainer sleeve 70 to flexibly compress and expand as at least portions of some of the sections 55 move toward and away from each other.

The above-described structure of retainer sleeve 70 that allows retainer sleeve 70 to compress and expand may be referred to herein as an "accordion-like" arrangement or configuration.

Figure 6:
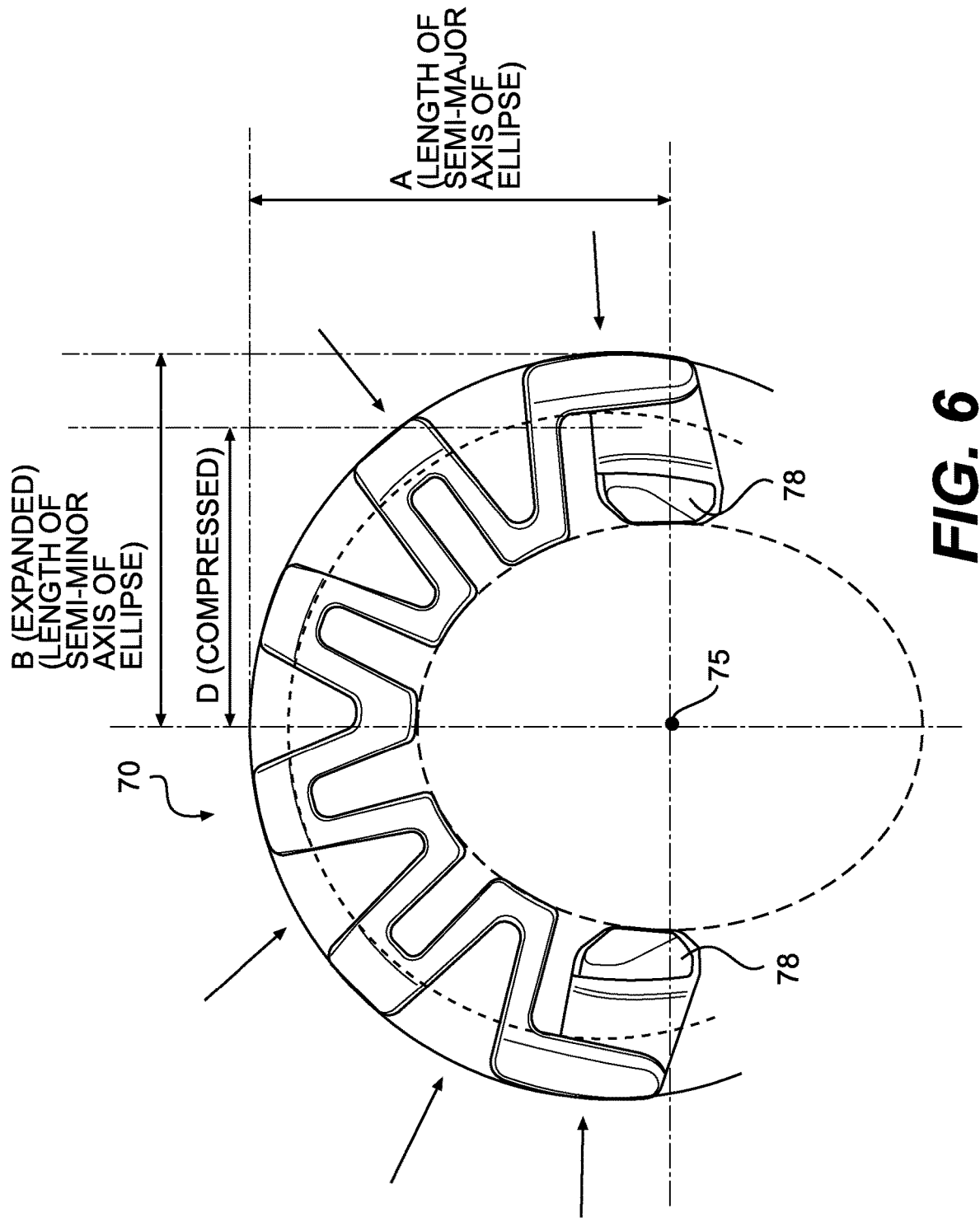
FIG. 6 is a top view of a retainer sleeve according to one exemplary embodiment of the present disclosure.

Lock 60 may be received within retainer sleeve 70 and may be configured to be rotated about lock rotation axis 65. Outer frustoconical surfaces formed by radially outer edges 73 and 76 of retainer sleeve 70 may be configured to mate with lock cavity 40 of ground engaging tool tip 30. The segmented inner surface of retainer sleeve 70 formed by radially inner edges 74 of the plurality of sections 55 may extend at least partially around the lock rotation axis 65, and may be aligned in a direction substantially parallel to the lock rotation axis. Pairs of the plurality of sections 55 of retainer sleeve 70 may be joined together along radially inner edges 74 of adjacent sections or along portions of radially outer edges 73 of adjacent sections in an accordion-like arrangement configured such that retainer sleeve 70 is compressible for insertion into lock cavity 40, and expandable when the retainer sleeve 70 seats inside lock cavity 40. The above-described configuration of retainer sleeve 70 also enables fabrication of the retainer sleeve from metal, thus providing a retainer system component that is able to withstand much higher temperatures and harsher environments than many existing plastic components for ground engaging tool retainer systems. Retainer sleeve 70 may also be formed with a generally elliptical shape, as best seen in FIG. 6. In this manner, manufacturing tolerances for retainer sleeve 70 may be more easily accommodated such that retainer sleeve 70 will fit snugly into lock cavity 40 after compression and expansion during assembly into lock cavity 40. Additionally, a tighter fit between retainer sleeve 70 and lock 60 may be achieved. As shown in FIG. 6, a length of a semi-major axis of an ellipse defined by the radially outermost edge of retainer sleeve 70 may be designated "A", and a length of a semi-minor axis of the ellipse may be designated "B". In one exemplary implementation, at least the length B of the semi-minor axis of the elliptically shaped retainer sleeve may be compressed to a smaller length D when retainer sleeve 70 is inserted into lock cavity 40.

Figure 5:
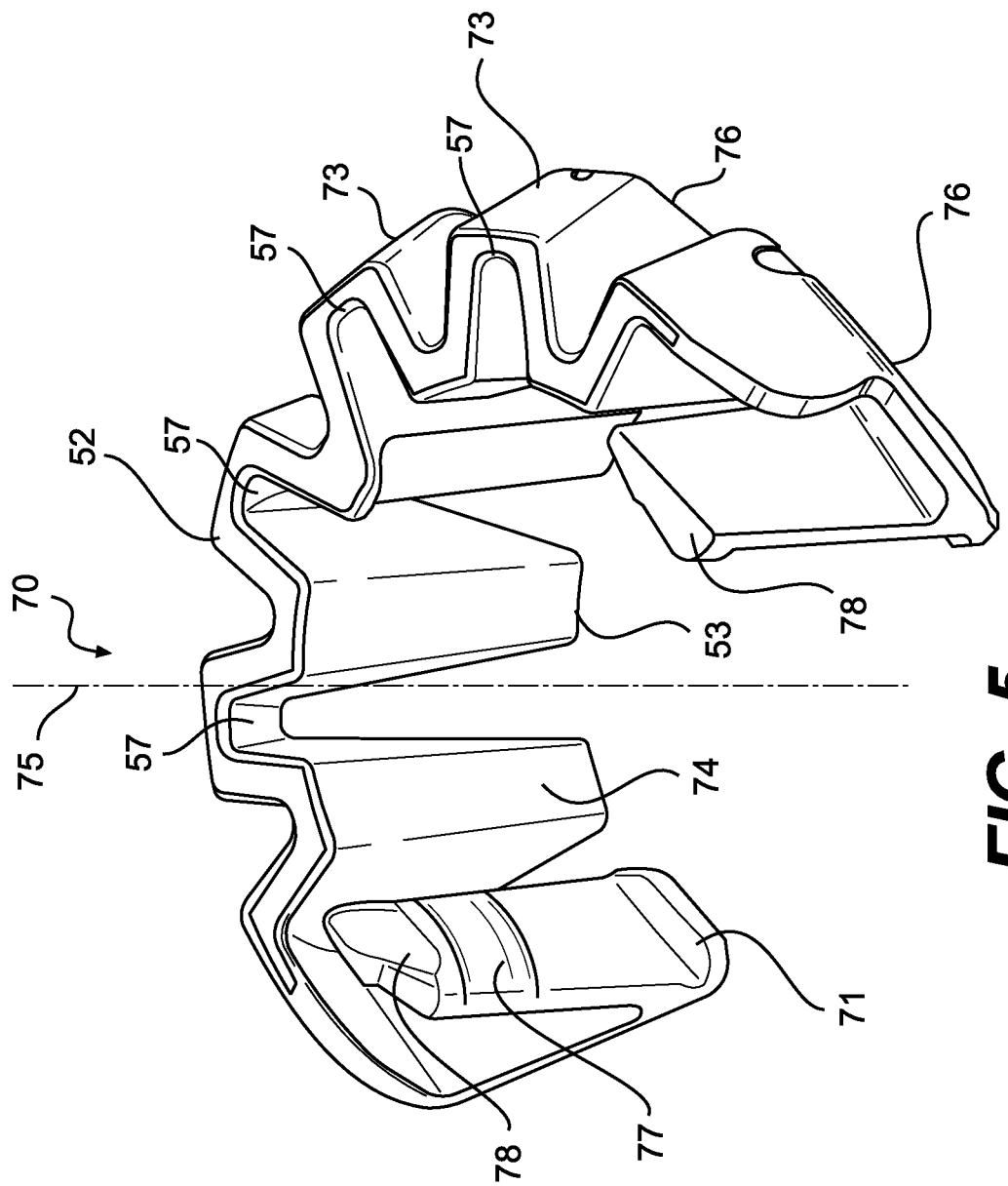
FIG. 5 is a perspective view from a radially inner side of the retainer sleeve shown in FIG. 4.
Figure 7:
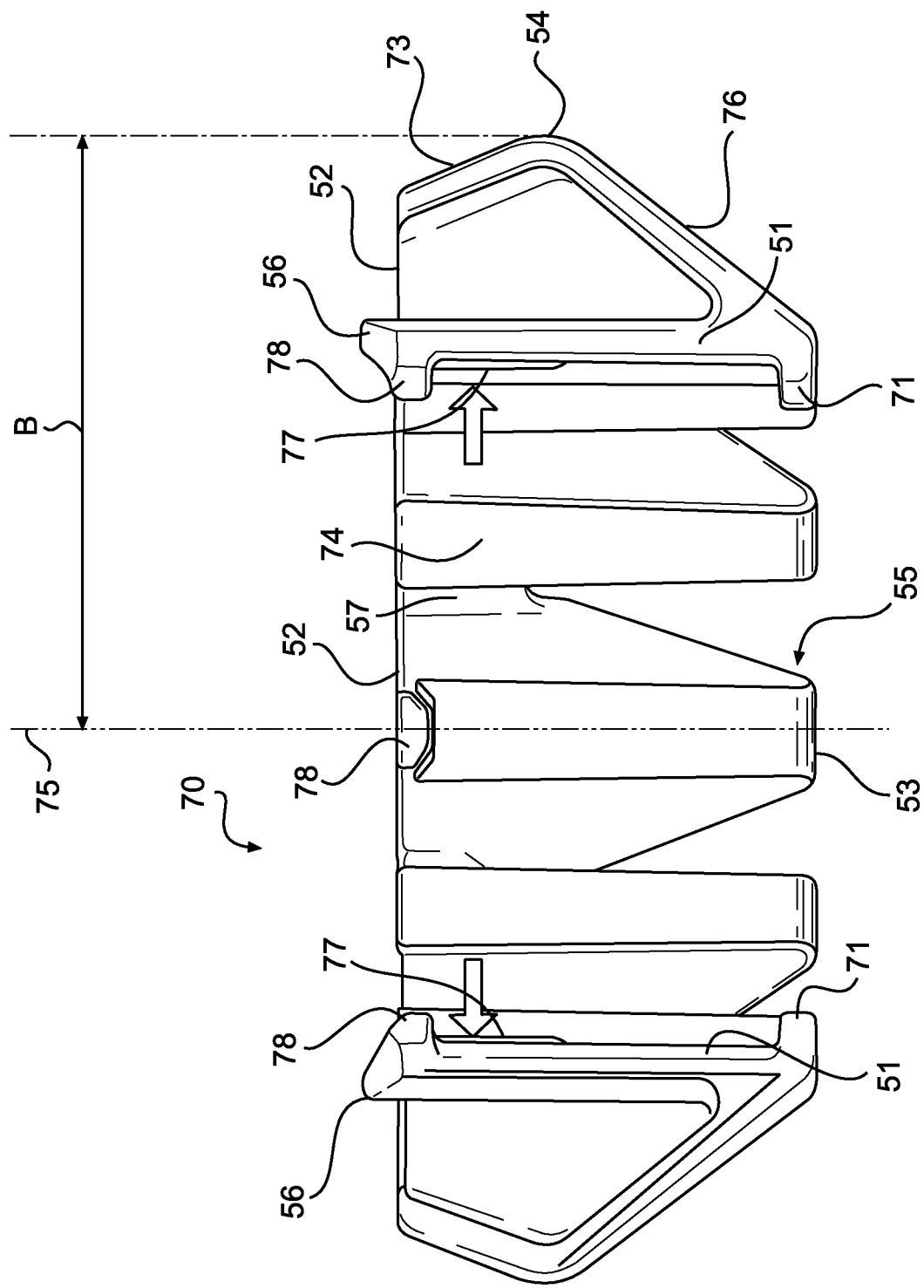
FIG. 7 is a side elevation view from a radially inner side of the retainer sleeve of FIG. 4.
Figure 10:
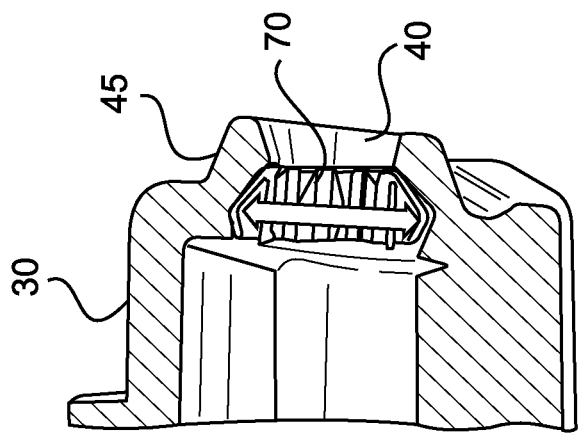
FIG. 10 is a lateral cross-sectional assembly view through the ground engaging tool tip of FIG. 8, illustrating expansion and seating of the retainer sleeve in the lock cavity.
Figure 9:
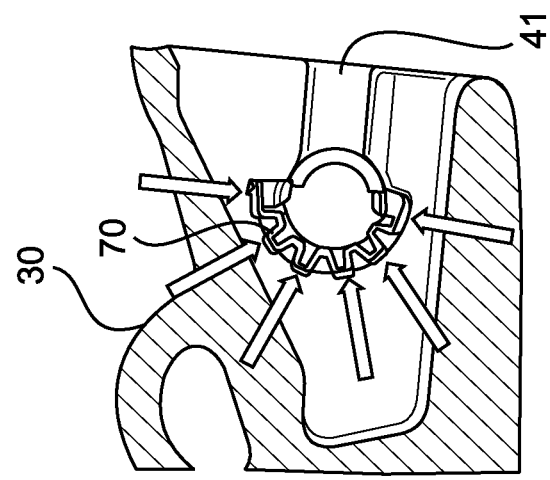
FIG. 9 is a longitudinal cross-sectional assembly view through the ground engaging tool tip of FIG. 8, illustrating compression and installation of the retainer sleeve into the lock cavity.
Figure 8:
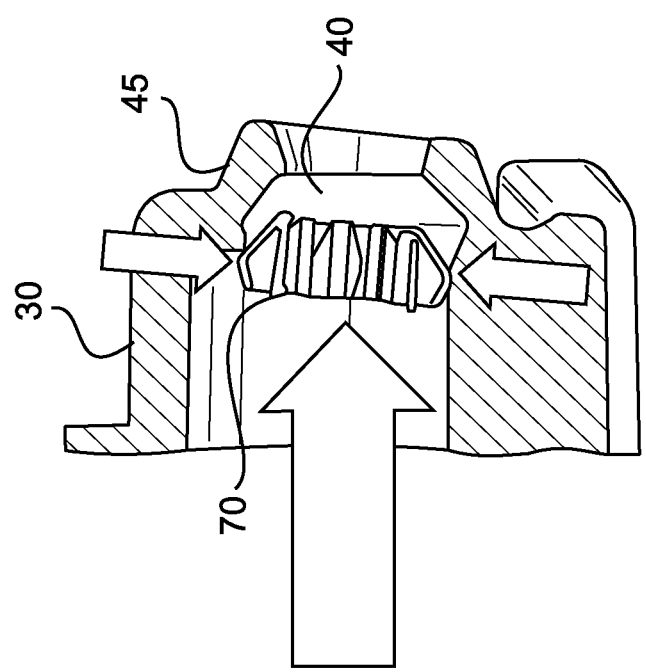
FIG. 8 is a lateral cross-sectional assembly view through the ground engaging tool tip illustrating compression and installation of a retainer sleeve into a lock cavity of the tool tip.
Figure 13:
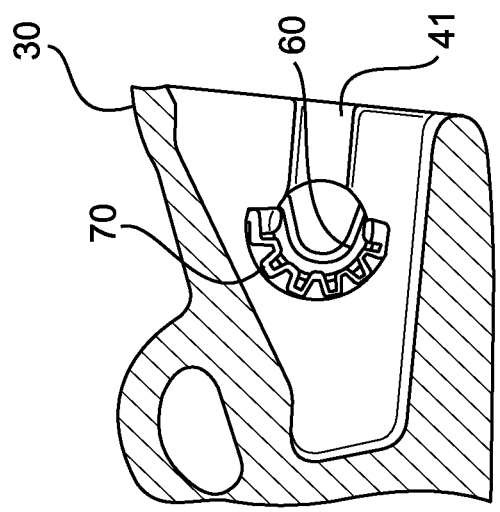
FIG. 13 is a longitudinal cross-sectional assembly view through the ground engaging tool tip of FIG. 8, illustrating installation of the locking member of FIG. 12 into the retainer sleeve after the retainer sleeve is seated in the lock cavity.
Figure 12:
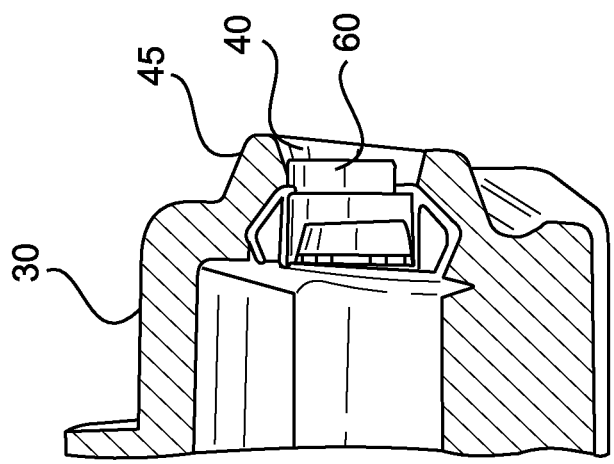
FIG. 12 is a lateral cross-sectional assembly view through the ground engaging tool tip of FIG. 8, illustrating installation of a locking member into the retainer sleeve after the retainer sleeve is seated in the lock cavity.
Figure 11:
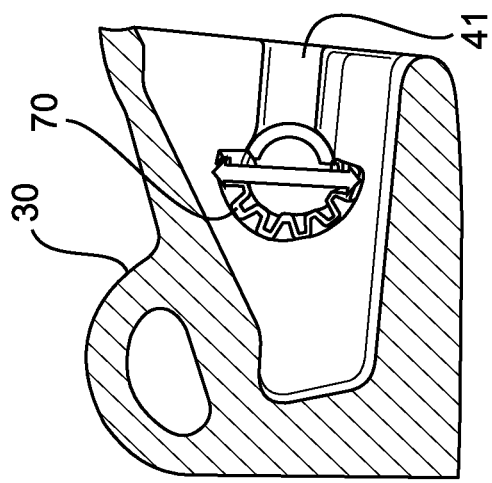
FIG. 11 is a longitudinal cross-sectional assembly view through the ground engaging tool tip of FIG. 8, illustrating expansion and seating of the retainer sleeve in the lock cavity.
Figure 14:
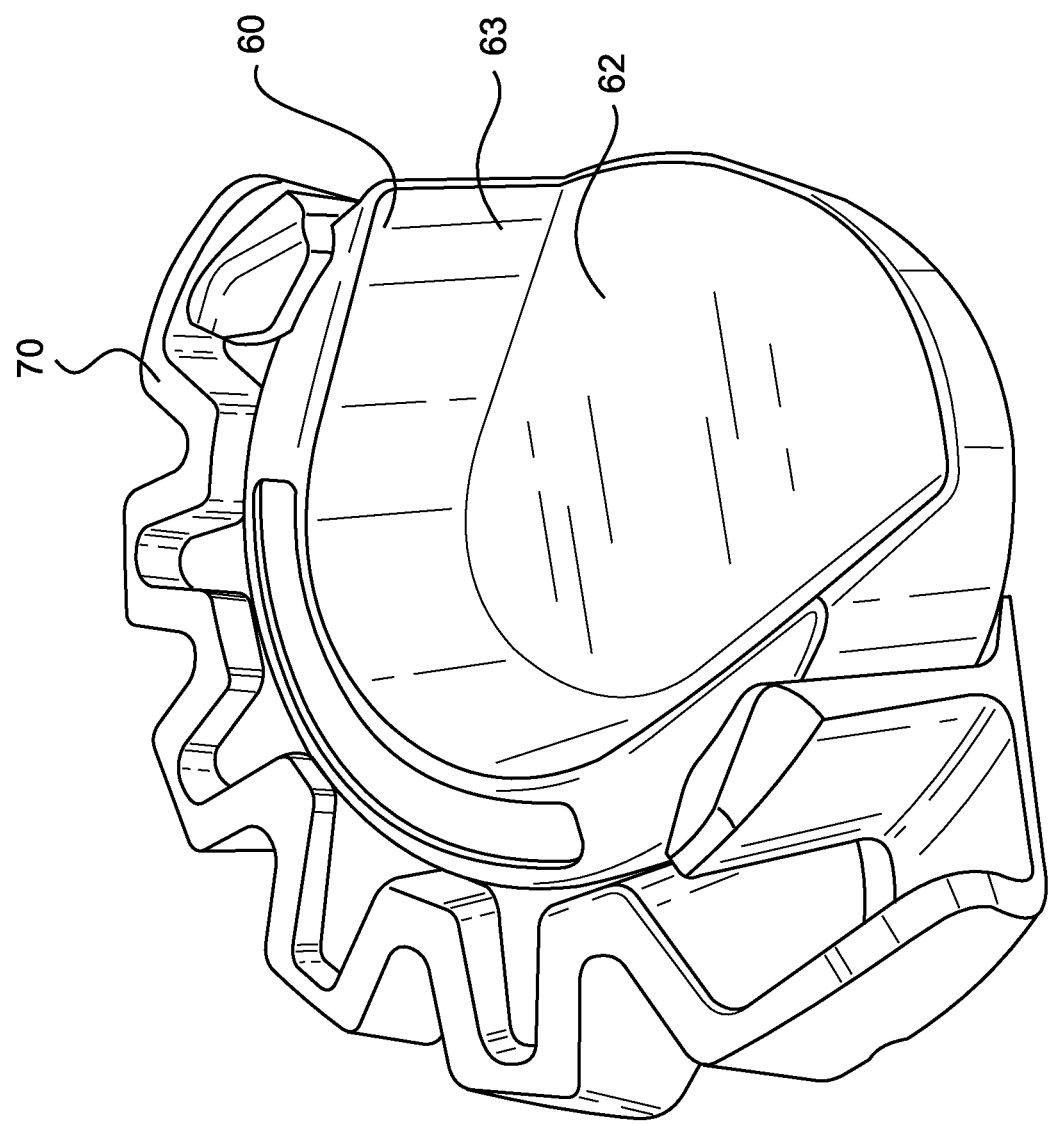
FIG. 14 is a perspective assembly view of a lock seated in a retainer sleeve in accordance with an exemplary embodiment of this disclosure.
Figure 15:
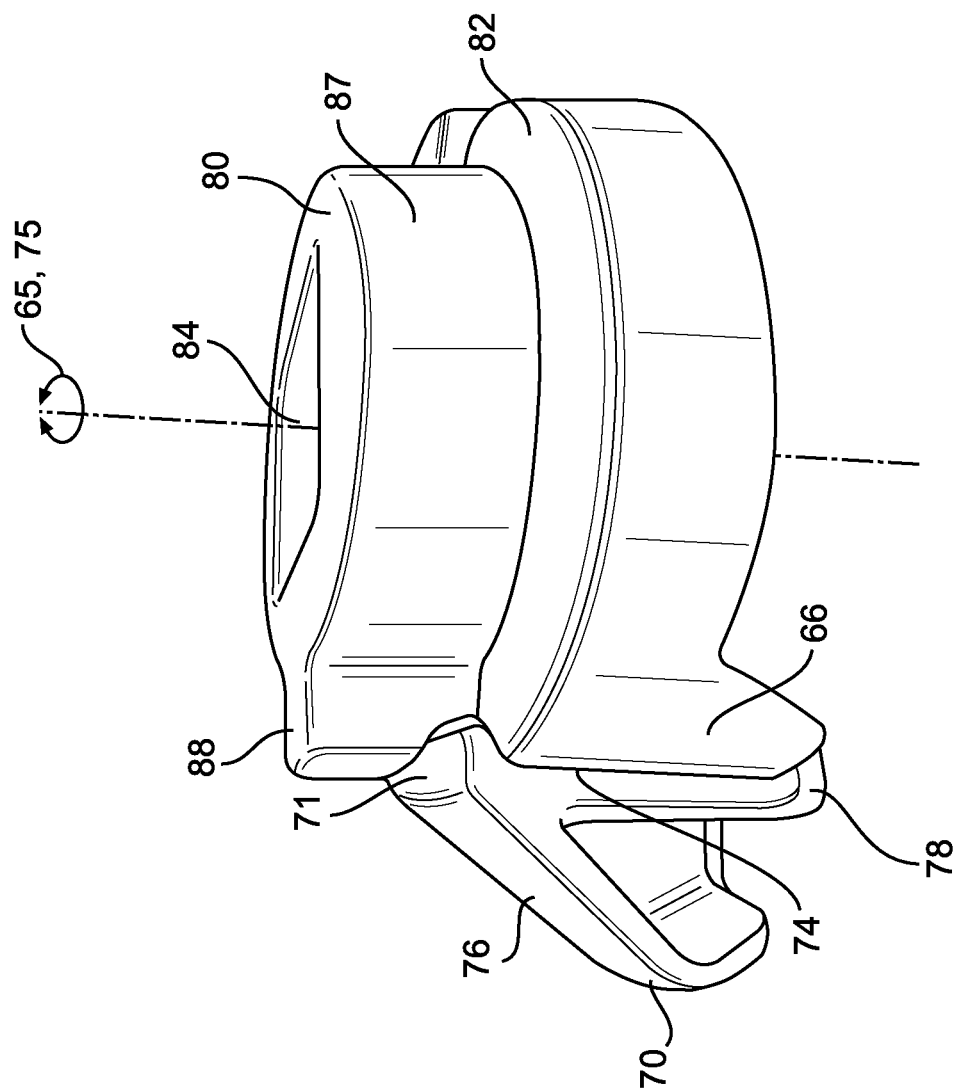
FIG. 15 is a perspective assembly view from the opposite side of the lock and retainer sleeve of FIG. 14.

As best seen in the radially inner perspective view of FIG. 5, the radially inner side elevation view of FIG. 7, and the perspective assembly views of FIGS. 14 and 15, retainer sleeve 70 may further include at least one resiliently cantilevered lock detent arm 51 joined at a first, proximal or base end to a plate-like section at one or both of the opposite circumferential ends of substantially C-shaped retainer sleeve 70. Lock detent arms 51 may each include a top lip 78 at a second, distal end 56 opposite from the first, proximal end of the lock detent arm. Top lip 78 may be configured to slidably engage with a bottom surface of lock 60 of the retainer system to retain lock 60 in position relative to retainer sleeve 70 and lock cavity 40. Each lock detent arm 51 may also include a bottom lip 71 at the first, proximal end configured to engage with a shoulder 82 of lock 60.

Assembly of lock 60 into retainer sleeve 70 may be performed after retainer sleeve 70 has been compressed and then expanded into position within lock cavity 40. The resiliently cantilevered lock detent arms 51 of retainer sleeve 70 allow for assembly of lock 60 into retainer sleeve 70 after retainer sleeve 70 has been installed in lock cavity 40. Each lock 60 may be pressed into retainer sleeve 70 in a laterally outward direction relative to ground engaging tool tip 30 from within mounting cavity 35 of tip 30 before tip 30 is installed on nose 21 of adaptor 20. Lock 60 resiliently deflects top lips 78 at distal ends 56 of lock detent arms 51 radially outward as lock 60 is inserted into retainer sleeve

70. Lock detent arms 51 and top lips 78 spring back to slidably engage with a bottom surface of lock 60 once shoulder 82 of lock 60 contacts lips 71, as best seen in FIG. 15. In this manner retainer sleeve 70 rotatably retains lock 60 in lock cavity 40 such that lock 60 may be rotated about lock rotation axis 65 while being prevented from moving axially out of lock cavity 40.

As further shown in FIGS. 5 and 7, at least one lock detent arm 51 may include a detent projection 77 extending from a radially inner surface adjacent second, distal end 56 of lock detent arm 51. Detent projection 77 may be configured for engagement with a recess 67 (FIGS. 16 and 17) formed in lock 60. Engagement of detent projections 77 of lock detent arms 51 on retainer sleeve 70 in recesses 67 of lock 60 serves to releasably hold locks 60 in the position shown in FIG. 3 during assembly of tip 30 onto nose 21 of adaptor 20. Once tip 30 has been fully installed on nose 21, each lock 60 may be forcibly rotated 180 degrees, causing lock detent arms 51 and detent projections 77 to deflect out of recesses 67, and then reengage with recesses 67 in a locked position with posts 23 of adaptor 20 trapped in lock cavities 40 by locks 60.

Retainer sleeve 70 may be configured to mate with inner surface 43 of lock cavity 40. For example, retainer sleeve 70 may include segmented outer frustoconical surfaces defined by radially outer edges 73 and 76 configured to mate with corresponding frustoconical portions of inner surface 43 in lock cavity 40. When retainer sleeve 70 is disposed within lock cavity 40 with the segmented frustoconical outer surfaces mated to the corresponding frustoconical portions of inner surface 43, retainer sleeve central axis 75 may coincide with lock rotation axis 65 of lock 60.

Lock cavity 40 may be configured such that, when retainer sleeve 70 is seated in lock cavity 40, rotation of retainer sleeve 70 with respect to lock rotation axis 65 is substantially prevented. For example, as best shown in FIG. 2, lock cavity 40 may include a shoulder 48 extending adjacent the circumferential outer ends of inner surface 43 and abutting the circumferential outer ends of substantially C-shaped retainer sleeve 70. Retainer sleeve 70 may also include a segmented inner surface defined by radially inner edges 74 opposite the frustoconical outer surfaces and extending circumferentially around and concentric with retainer sleeve central axis 75. Accordingly, the segmented inner surface may extend circumferentially around and concentric with lock rotation axis 65 when retainer sleeve 70 is assembled with lock 60 in lock cavity 40.

In some exemplary embodiments, retainer sleeve 70 may include one or more lock detent arms 51 with detent projections 77 configured for engagement with corresponding recesses 67 of lock 60. Detent projections 77 may have various shapes. In one exemplary embodiment, each detent projection 77 may include a generally convex curved surface, such as a constant-radius surface, jutting radially outward from distal end 56 of lock detent arm 51. The convex curved surface may decrease in size (e.g., radius) along a direction substantially parallel to retainer sleeve central axis 75. Each of detent projections 77 may have a convex curved surface with a substantially constant radius, whose center may be positioned at a distance from retainer sleeve central axis 75 that is greater than a distance between retainer sleeve central axis 75 and an outer-most surface of retainer sleeve 70.

Figure 17:
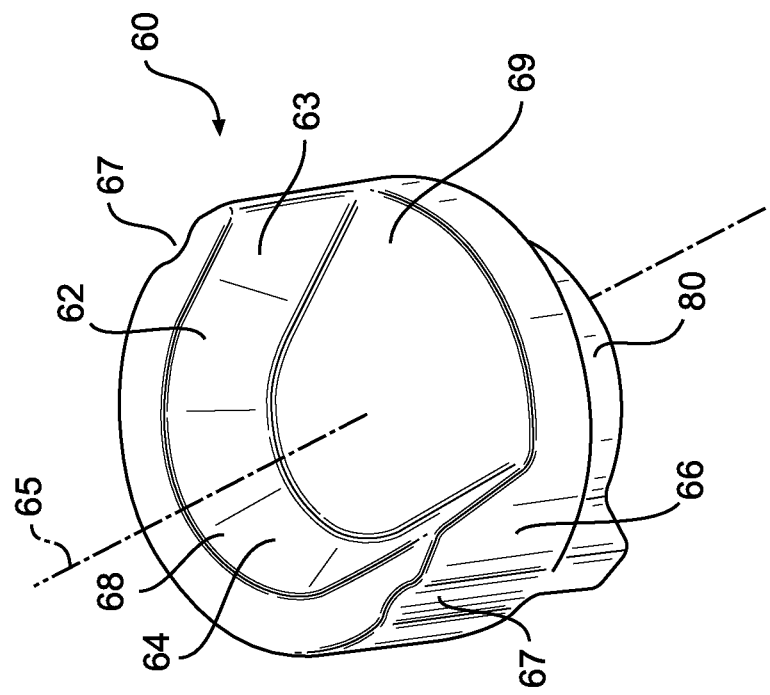
FIG. 17 is a perspective view from the opposite side of the lock shown in FIG. 15.
Figure 16:
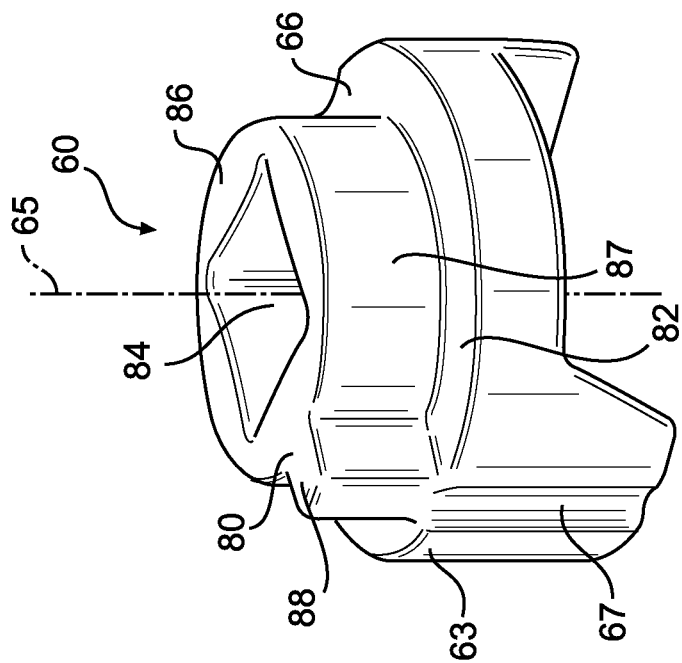
FIG. 16 is a perspective view from one side of the lock shown in FIG. 15.

As mentioned above, lock 60 may be configured to mate with inner surface 74 of retainer sleeve 70. For example, as best shown in FIGS. 16 and 17, lock 60 may include a skirt 63 with an outer surface 66 having substantially the same profile as the segmented inner surface formed by radially inner edges 74 of retainer sleeve 70. Outer surface 66 of skirt 63 may be concentric with and extend circumferentially around lock rotation axis 65. Skirt 63 and outer surface 66 may extend only partway around lock rotation axis 65. For example, skirt 63 and outer surface 66 may extend around lock rotation axis 65 substantially the same angular degree that the substantially C-shaped retainer sleeve 70 extends around retainer sleeve central axis 75. With skirt 63 and outer surface 66 of lock 60 so configured, lock 60 may be seated within retainer sleeve 70 with outer surface 66 of lock 60 mated to the segmented inner surface of retainer sleeve 70. When lock 60 is so positioned within retainer sleeve 70, lock rotation axis 65 may coincide with retainer sleeve central axis 75.

As discussed above, lock 60 may include one or more detent recesses 67 configured to engage corresponding detent projections 77 on distal ends 56 of lock detent arms 51 resiliently cantilevered from opposite circumferential ends of retainer sleeve 70. Interaction of detent projections 77 and detent recesses 67 may releasably hold lock 60 in predetermined rotational positions about lock rotation axis 65. For example, as shown in FIGS. 16 and 17, detent recess 67 of lock 60 may extend radially inward from outer surface 66 of skirt 63. Detent recesses 67 may have a shape configured to mate with detent projections 77. In the embodiment shown in FIGS. 16 and 17, detent recesses 67 may include a concave surface, such as a constant-radius curved surface, extending radially inward from outer surface 66. In some embodiments, detent recesses 67 may be spaced approximately the same distance from one another as detent projections 77. Thus, where detent projections 77 on lock detent arms 51 of retainer sleeve 70 are spaced approximately 180 degrees from one another, detent recesses 67 of lock 60 may likewise be spaced approximately 180 degrees from one another. Accordingly, lock 60 may be positioned in retainer sleeve 70 with outer surface 66 seated against the segmented inner surface of retainer sleeve 70 and detent projections 77 extending into detent recesses 67. In an alternative embodiments, lock 60 may include only one detent recess 67 while retainer sleeve 70 may include two detent projections 77, wherein one detent projection 77 may be formed at distal end 56 of each of two lock detent arms 51.

Resiliently cantilevered lock detent arms 51 of metal retainer sleeve 70 may be configured to deflect so as to allow detent projections 77 to engage and/or disengage detent recesses 67 of lock 60. As a result, even a retainer sleeve 70 made from a relatively rigid metal material may still allow sufficient flexibility in the cantilevered lock detent arms 51 to accommodate engagement and disengagement of detent projections 77 from detent recesses 67.

According to one exemplary embodiment, metal retainer sleeve 70 may be constructed of a high temperature steel alloy or other metal material, which may be formed into the desired configuration by any of a variety of manufacturing techniques. Lock 60 may also be constructed of metal. Alternatively or additionally, all or a portion of the surface of lock 60 may be coated with a friction-reducing material. The term "friction-reducing material," as used herein, refers to a material that renders the surface of lock 60 to have a friction coefficient ranging from approximately 0.16 to approximately 0.7. For example, at least a portion of the surface of lock 60 may be plated with zinc to reduce friction on the surface of lock 60 (e.g., surface between lock 60 and the segmented inner surface of retainer sleeve 70 formed by radially inner edges 74) to a friction coefficient between approximately 0.16 to approximately 0.7.

In another exemplary embodiment, at least a portion of the surface of lock 60 may be coated with graphite powder. The graphite powder may be aerosolized and sprayed directly onto the surface of lock 60. Alternatively or additionally, the graphite powder may be mixed with a suitable solvent material and applied to the surface of lock 60 by using a brush or dipping the lock 60 into the mixture. In one exemplary embodiment, a commercially available graphite lubricant, such as the products sold under trademark SLIP Plate, may be used alternatively or additionally.

Lock 60 may be configured to receive at least part of post 23 on nose 21 of adapter 20. For example, as best shown in FIGS. 3, 16, and 17, lock 60 may include a lock slot 62 extending into a skirt 63. Lock slot 62 may have an open end 69 between two circumferential ends of skirt 63 and a closed end 68 adjacent a middle portion of skirt 63. In some embodiments, lock slot 62 may have a size and shape such that it can receive frustoconical post 23 of adapter 20. The inner surface 64 of skirt 63 may be sloped so as to mate with frustoconical post 23 of adapter 20 adjacent closed end 68 of lock slot 62.

Lock 60 may also include a head portion 80 attached to skirt 63 adjacent the narrow end of skirt 63. As best shown in FIGS. 16 and 17, head portion 80 may include a shoulder 82 extending in a plane substantially perpendicular to lock rotation axis 65 and across the narrow end of skirt 63. In some embodiments, shoulder 82 may fully enclose the side of lock slot 62 adjacent the narrow end of skirt 63. The side of head portion 80 opposite lock slot 62 may include a projection 86 extending from shoulder 82 away from skirt 63 along lock rotation axis 65. Projection 86 may include a substantially cylindrical outer surface 87 extending around most of lock rotation axis 65 and a tab 88 extending radially outward relative to lock rotation axis 65. In some exemplary embodiments, tab 88 may extend transverse relative to the direction that lock slot 62 extends from open end 69 to closed end 68.

As mentioned above, lock 60 may be installed with retainer sleeve 70 in lock cavity 40 with outer surface 66 of lock 60 mated to the segmented inner surface formed by radially inner edges 74 of retainer sleeve 70. Detent recesses 67 of lock 60 may be mated to detent projections 77 on lock detent arms 51 of retainer sleeve 70. When lock 60 is disposed in this position, open end 69 of lock slot 62 may face rearward, as shown in FIGS. 3 and 14. This position allows sliding insertion and removal of post 23 into and out of lock slot 62 through open end 69. Accordingly, this position of lock 60 may be considered an unlocked position.

To lock post 23 inside lock slot 62, lock 60 may be rotated about lock rotation axis 65 and relative to stationary retainer sleeve 70 to a locked position. In this locked position, the portion of lock skirt 63 adjacent closed end 68 may preclude sliding movement of post 23 relative to lock slot 62, thereby preventing sliding movement of tip 30 relative to adapter 20. The locked position of lock 60 may be approximately 180 degrees from the unlocked position about lock rotation axis 65. In the locked position, as in the unlocked position, detent recesses 67 of lock 60 may engage detent projections 77 on lock detent arms 51 of retainer sleeve 70, which may releasably hold lock 60 in the locked position.

To rotate lock 60 between the unlocked position and the locked position, sufficient torque may be applied to lock 60 with respect to lock rotation axis 65 to cause detent projections 77 and/or detent recesses 67 to deflect and disengage from one another. Once detent projections 77 and detent recesses 67 are disengaged from one another, outer surface 66 of skirt 63 of lock 60 may slide along the segmented inner surface of retainer sleeve 70 as lock 60 rotates around lock rotation axis 65. Once lock 60 rotates approximately 180 degrees around lock rotation axis 65, detent projections 77 and detent recesses 67 may reengage one another to releasably hold lock 60 in that rotational position relative to retainer sleeve 70 and lock cavity 40.

Lock 60 may also include a tool interface 84 in head portion 80 to facilitate rotating lock 60 about lock rotation axis 65. Tool interface 84 may include any type of features configured to be engaged by a tool for applying torque to lock 60 about lock rotation axis 65. For example, as shown in FIG. 16, tool interface 84 may include a socket recess with a cross-section configured to engage a socket driver, such as a socket wrench. When lock 60 is seated within lock cavity 40, head portion 80 defining tool interface 84 may extend at least partially through lock cavity 40 and lock bosses 45, and lock cavity 40 may provide an access opening for a tool to engage tool interface 84.

Ground engaging tools and the associated retainer systems of the present disclosure are not limited to the exemplary configurations described above. For example, ground engaging tool 10 may include a different number of lock cavities 40, and ground engaging tool 10 may employ a different number and configuration of posts 23, locks 60, and retainer sleeves 70. Additionally, in lieu of adapter 20 and posts 23, ground engaging tool 10 may employ one or more pins fixed to or integrally formed with suitable support structure.

Certain exemplary aspects of the present disclosure may provide various alternative and/or additional configurations of retainer systems for removably attaching ground engaging tools to suitable support structure of an implement. For example, further modifications to a lock and/or a retainer sleeve of a retainer system may be possible to improve the performance of the retention system. Outer surface 66 of lock 60 and the segmented inner surface of retainer sleeve 70, which together form the interface between lock 60 and retainer sleeve 70, may be tapered or conical in shape, or generally cylindrical in shape with respect to lock rotation axis 50. A more cylindrical configuration may facilitate rotation of lock 60 relative to retainer sleeve 70 despite the presence of some packed work material in the space around lock 60 and retainer sleeve 70. Moreover, as discussed above, retainer sleeve 70 may also be formed with an elliptical shape, as best seen in FIG. 6. In this manner, manufacturing tolerances for retainer sleeve 70 may be more easily accommodated such that retainer sleeve 70 will fit snugly in lock cavity 40 after compression and expansion during assembly into lock cavity 40. Additionally, a tighter fit between retainer sleeve 70 and lock 60 may be achieved when retainer sleeve 70 starts off in a substantially elliptical configuration before insertion of a substantially round lock 60, but is deformed into a substantially round configuration upon installation into lock cavity 40 and insertion of lock 60.

Having the interface between lock 60 and retainer sleeve 70 aligned in parallel with respect to lock retainer axis 50 may allow insertion of lock 60 into retainer sleeve 70 along lock rotation axis 65 for engagement with retainer sleeve 70. For example, lock 60 may be inserted into retainer sleeve 70, where outer surface 66 of lock 60 may slide over the segmented inner surface formed by radially inner edges 74 of retainer sleeve 70 in the direction of lock rotation axis 65. As discussed above, this may also allow retainer sleeve 70 to be placed in lock cavity 40 prior to engagement with lock 60. For example, retainer sleeve 70 may first be placed in lock cavity 40 before being assembled or engaged with lock 60. Thereafter, lock 60 may be slid into retainer sleeve 70 in the direction of lock rotation axis 65.

As discussed above, and as shown in FIGS. 14 and 15, lock detent arms 51 of retainer sleeve 70 may include top lips 78 at distal ends 56 of each lock detent arm, and bottom lips 71 at the base or proximal ends of each lock detent arm 51. The radially outermost surface 54 of lock 60 resiliently deflects top lips 78 of lock detent arms 51 radially outward as lock 60 is inserted into retainer sleeve 70. Lock detent arms 51 and top lips 78 spring back to slidably engage with a bottom surface of lock 60 once shoulder 82 of lock 60 contacts bottom lips 71, as best seen in FIG. 15. In this manner retainer sleeve 70 rotatably retains lock 60 in lock cavity 40 such that lock 60 may be rotated about lock rotation axis 65 while being prevented from moving axially out of lock cavity 40.

INDUSTRIAL APPLICABILITY

The disclosed retainer systems and ground engaging tools may be applicable to various earth-working machines, such as, for example, excavators, wheel loaders, hydraulic mining shovels, cable shovels, bucket wheels, bulldozers, and draglines. When installed, the disclosed retainer systems and ground engaging tools may protect various implements associated with the earth-working machines against wear in the areas where the most damaging abrasions and impacts occur and, thereby, prolong the useful life of the implements. The disclosed metal retainer sleeve 70 of the retainer system may provide a high temperature and wear resistant component for retention of lock 60 in lock cavity 40 of ground engaging tool tips 30. Moreover, the accordion-like configuration of metal retainer sleeve 70 and resiliently cantilevered lock detent arms 51 allow for even a relatively rigid material such as a high strength metal alloy to flexibly compress and expand as needed for insertion into lock cavity 40 and installation of a metal lock 60 into metal retainer sleeve 70.

The disclosed elliptical configuration of metal retainer sleeve 70 in various exemplary embodiments of the retainer sleeve and retainer systems may improve manufacturability and reduce costs as a result of taking up relatively large tolerance ranges in the lock cavities 40 of tip 30. The elliptical configuration of metal retainer sleeve 70 may also enable a tighter fit between lock detent projections 77 on lock detent arms 51 and detent recesses 67 on locks 60. Various embodiments of the disclosed components such as metal retainer sleeve 70 provide secure and reliable attachment and detachment of ground engaging tools to various earth-working implements. In particular, certain configurations of the disclosed retainer systems may address certain issues associated with high temperature applications such as when the ground engaging tools are being used for working with slag or when ripping rock.

In one exemplary embodiment shown in FIGS. 8-13, a retainer system 50 includes lock 60 and metal retainer sleeve 70. Metal retainer sleeve 70 is formed in an accordion-like structure configured to mate with inner surface 43 of lock cavity 40 of tip 30. Lock 60 is configured to mate with the segmented inner surface formed by radially inner edges 74 of retainer sleeve 70. To attach tip 30 to adapter 20, lock 60 and retainer sleeve 70 are assembled into lock cavity 40 of tip 30. Lock cavity 40 opens into side slot 41 that extends rearward, which allows passage of post 23 of adapter 20. Once post 23 is inserted inside lock slot 62, lock 60 is rotated about lock rotation axis 65 to a locked position. In this position, lock 60 and retainer sleeve 70 cooperatively lock post 23 inside lock slot 62, so as to prevent sliding movement of tip 30 relative to adapter 20. In the locked position, detent recess 67 of lock 60 may engage detent projection 77 on lock detent arm 51 of metal retainer sleeve 70, which may releasably hold lock 60 in the locked position.

To detach tip 30 from adapter 20, lock 60 is rotated from the locked position to an unlocked position to cause detent recess 67 and detent projection 77 to disengage from one another. Once detent recess 67 and detent projection 77 are disengaged from one another, outer surface 66 of lock 60 may slide along the segmented inner surface formed by radially inner edges 74 of metal retainer sleeve 70, as lock 60 rotates around lock rotation axis 65. Once lock 60 rotates approximately 180 degrees around lock rotation axis 65, detent recess 67 and detent projection 77 may reengage one another to releasably hold lock 60 in a locked rotational position.

The disclosed metal retainer sleeve 70 may be manufactured using conventional techniques such as, for example, casting or molding. Alternatively, the disclosed metal retainer sleeve may be manufactured using conventional techniques generally referred to as additive manufacturing or additive fabrication. Known additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of the metal retainer sleeve 70 in order to manufacture, or fabricate, the retainer sleeve. In one case, the disclosed retainer sleeve would be an original component and the 3D printing process would be utilized to manufacture the retainer sleeve. In other cases, the 3D process could be used to replicate an existing retainer sleeve and the replicated retainer sleeve could be sold as aftermarket parts. These replicated aftermarket retainer sleeves could be either exact copies of the original retainer sleeve or pseudo copies differing in only non-critical aspects.

Figure 18:
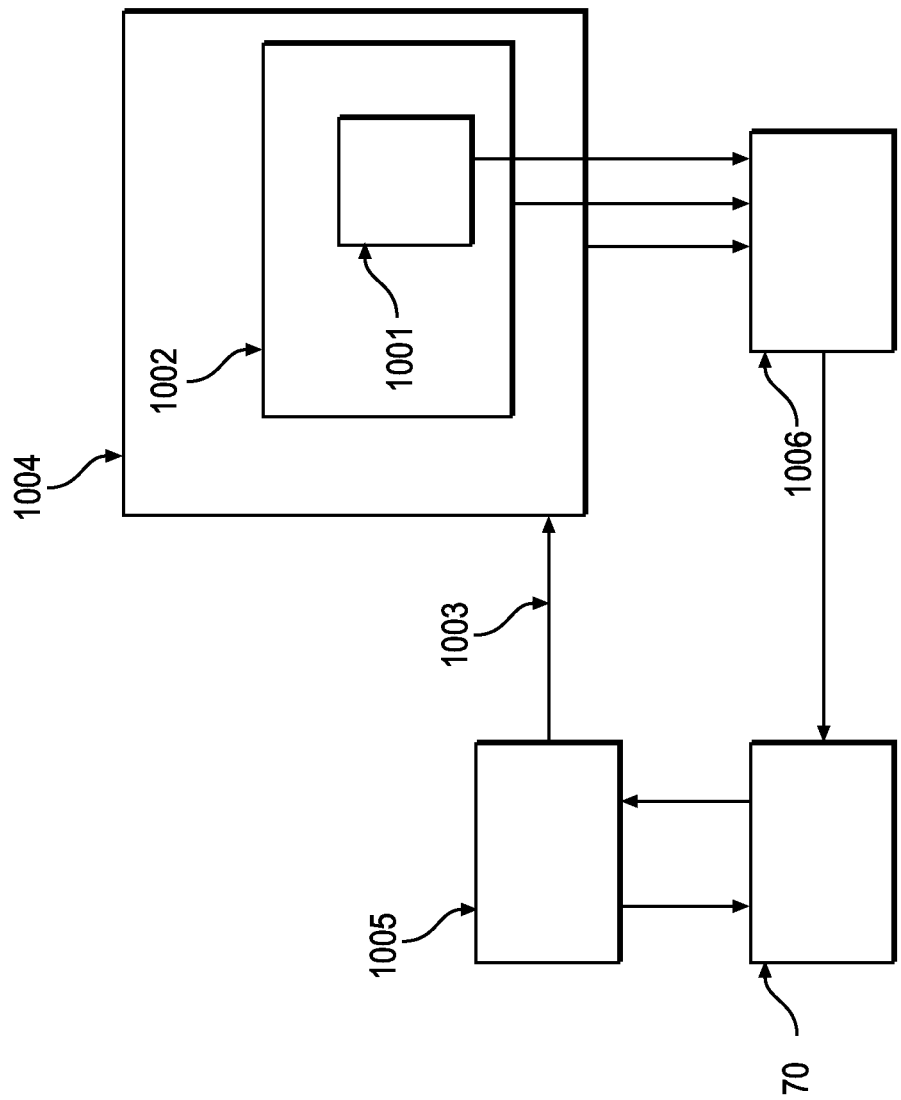
FIG. 18 is a schematic diagram illustrating a process for manufacturing a retainer sleeve in accordance with various disclosed embodiments.

With reference to FIG. 18, the three-dimensional model 1001 used to represent an original metal retainer sleeve 70 may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. This storage medium may be used in connection with commercially available 3D printers 1006 to manufacture, or fabricate, the metal retainer sleeve 70. Alternatively, the three-dimensional model may be transmitted electronically to the 3D printer 1006 in a streaming fashion without being permanently stored at the location of the 3D printer 1006. In either case, the three-dimensional model constitutes a digital representation of the retainer sleeve suitable for use in manufacturing the retainer sleeve 70.

The three-dimensional model may be formed in a number of known ways. In general, the three-dimensional model is created by inputting data 1003 representing the retainer sleeve to a computer or a processor 1004 such as a cloud-based software operating system. The data may then be used as a three-dimensional model representing the physical retainer sleeve. The three-dimensional model is intended to be suitable for the purposes of manufacturing the retainer sleeve. In an exemplary embodiment, the three-dimensional model is suitable for the purpose of manufacturing the retainer sleeve by an additive manufacturing technique.

In one embodiment depicted in FIG. 18, the inputting of data may be achieved with a 3D scanner 1005. The method may involve contacting the retainer sleeve via a contacting and data receiving device and receiving data from the contacting in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of the retainer sleeve by contacting a probe with the surfaces of the retainer sleeve in order to generate a three-dimensional model. In other embodiments, the 3D scanner 1005 may be a non-contact type scanner and the method may include directing projected energy (e.g. light or ultrasonic) onto the retainer sleeve to be replicated and receiving the reflected energy. From this reflected energy, a computer would generate a computer-readable three-dimensional model for use in manufacturing the retainer sleeve. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed retainer sleeve using the CAD software. A three-dimensional model would be generated from the CAD virtual 3D model in order to manufacture the retainer sleeve.

The additive manufacturing process utilized to create the disclosed retainer sleeve may involve materials such as plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

It will be apparent to those skilled in the art that various modifications and variations can be made to the disclosed retainer sleeve, retainer systems, and/or ground engaging tool systems. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A retainer sleeve configured for use in a retainer system for a ground engaging tool, the retainer sleeve comprising:
a plurality of plate-like sections, each section being flexibly joined with an adjacent section along either a radially inner edge or a portion of a radially outer edge;
the radially inner edges of the plurality of sections forming part of a segmented inner surface configured for engagement with an outer surface of a locking member of the retainer system, the inner surface extending partially around a central axis of the retainer sleeve to form a substantially C-shaped retainer sleeve having opposite circumferential ends that are spaced from each other;
the radially outer edges of the plurality of sections forming part of a segmented, frustoconical outer surface configured for engagement in an internal lock cavity of a ground engaging tool tip; and
at least one lock detent arm connected at a first, base end to a plate-like section at one of the opposite circumferential ends of the substantially C-shaped retainer sleeve, wherein the at least one lock detent arm includes a detent projection extending from a radially inner surface adjacent a second, distal end of the lock detent arm, the detent projection being configured for engagement with a detent recess formed in the locking member of the retainer system.

2. The retainer sleeve of claim 1, wherein the plurality of plate-like sections are flexibly joined together such that the substantially C-shaped retainer sleeve is compressible for insertion into the lock cavity, and expandable when the substantially C-shaped retainer sleeve seats inside the lock cavity.

3. The retainer sleeve of claim 1, wherein at least some of the plate-like sections are substantially trapezoidal or triangular in shape.

4. The retainer sleeve of claim 1, wherein the retainer sleeve is made from metal.

5. The retainer sleeve of claim 1, wherein the at least one lock detent arm includes a top lip at a second, distal end configured to slidably engage with a bottom surface of the locking member of the retainer system to retain the locking member in position relative to the retainer sleeve and the lock cavity; and
the at least one lock detent arm being configured to resiliently deflect outwardly at its second, distal end to allow passage of the locking member past the top lip when the locking member is inserted into the retainer sleeve.

6. The retainer sleeve of claim 5, wherein a lock detent arm including a top lip at a second distal end is connected at each of the opposite circumferential ends of the substantially C-shaped retainer sleeve.

7. The retainer sleeve of claim 1, wherein the segmented inner surface is elliptical in shape before engagement with the outer surface of the locking member of the retainer system.

8. A retainer system for a ground engaging tool, the retainer system comprising:
a lock configured to be rotated about a lock rotation axis; and
a metal retainer sleeve, wherein the metal retainer sleeve includes:
an outer surface configured to mate with a lock cavity of a ground engaging tool tip;
an inner surface extending at least partially around the lock rotation axis and being aligned in a direction substantially parallel to the lock rotation axis, and wherein the inner surface is configured to receive the lock rotatably about the lock rotation axis and in a direction substantially parallel to the lock rotation axis; and
a plurality of sections joined together along radially inner edges of adjacent sections or along radially outer edges of adjacent sections in an accordion-like arrangement configured such that the metal retainer sleeve is compressible for insertion into the lock cavity, and expandable when the metal retainer sleeve seats inside the lock cavity.

9. The retainer system of claim 8, wherein:
the radially inner edges of adjacent sections form part of the inner surface configured for engagement with an outer surface of the lock, the inner surface extending partially around a central axis of the retainer sleeve to form a substantially C-shaped retainer sleeve having opposite circumferential ends that are spaced from each other; and the radially outer edges of adjacent sections form part of a segmented, frustoconical outer surface configured for engagement in the lock cavity of the ground engaging tool tip.

10. The retainer system of claim 8, wherein the lock further includes:

a head portion; and a skirt portion extending from the head portion and defining a lock slot for receiving a post extending from a portion of an adapter configured to lock a ground engaging tool tip to a support member of a machine, the skirt portion including an outer surface extending about the lock rotation axis to rotatably engage the inner surface of the metal retainer sleeve, wherein the outer surface of the skirt portion of the lock is extended about the lock rotation axis and aligned in a direction substantially parallel to the lock rotation axis.

11. The retainer system of claim 8, wherein at least some of the sections are substantially trapezoidal or triangular in shape.

12. The retainer system of claim 9, further including at least one lock detent arm connected at a first, base end to a section at one of the opposite circumferential ends of the substantially C-shaped retainer sleeve.

13. The retainer system of claim 12, wherein the at least one lock detent arm includes a top lip at a second, distal end configured to slidably engage with a bottom surface of the lock to retain the lock in position relative to the retainer sleeve and the lock cavity; and the at least one lock detent arm being configured to resiliently deflect radially outwardly relative to the central axis of the retainer sleeve at its second, distal end to allow passage of the lock past the top lip when the lock is inserted into the retainer sleeve.

14. The retainer system of claim 12, wherein a lock detent arm including a top lip at a second distal end is connected at each of the opposite circumferential ends of the substantially C-shaped retainer sleeve.

15. The retainer system of claim 12, wherein:

the at least one lock detent arm includes a detent projection extending from a radially inner surface adjacent a second, distal end of the lock detent arm, the detent projection being configured for engagement with a detent recess formed in the lock.

16. The retainer system of claim 8, wherein the inner surface of the metal retainer sleeve forms a substantially elliptical shape before engagement with the outer surface of the lock of the retainer system.

* * * * *